United States Patent [19]

Simon et al.

[11] 4,301,180

[45] Nov. 17, 1981

[54] PROCESS FOR PRODUCING A FISH PRODUCT

[75] Inventors: Frank J. Simon, San Marcos; William C. Reinke, Delmar, both of Calif.; Hong-Ming Soo, Crestwood, Mo.; Christie L. Lanning, Chesterfield, Mo.; Stanley H. Richert, Webster Groves, Mo.

[73] Assignee: Ralston Purina Company, St. Louis, Mo.

[21] Appl. No.: 160,693

[22] Filed: Jun. 18, 1980

[51] Int. Cl.³ ..................... A23L 1/275; A23L 1/277; A23L 1/325

[52] U.S. Cl. .................. 426/250; 426/261; 426/281; 426/643; 426/518

[58] Field of Search ............... 426/250, 261, 281, 643, 426/652, 518

[56] References Cited

U.S. PATENT DOCUMENTS

| | | | |
|---|---|---|---|
| 1,608,832 | 11/1926 | Birdseye | 426/643 |
| 2,827,383 | 3/1958 | Gorton, Jr. | 426/282 |
| 3,493,391 | 2/1970 | Pottie | 426/643 |
| 3,863,017 | 1/1975 | Yueh | 426/643 |
| 4,060,644 | 11/1977 | Braid | 426/643 X |
| 4,136,204 | 1/1979 | Hughes et al. | 426/643 X |

FOREIGN PATENT DOCUMENTS 1240497  7/1971  United Kingdom ............... 426/643

Primary Examiner—Robert A. Yoncoskie
Attorney, Agent, or Firm—Joseph M. Hageman

[57] ABSTRACT

Red or dark meat portions of whole fish are injected into light meat fillets or loins of fish to produce a palatable, nutritious fish product. The process comprises comminuting the red meat, trim, including bellies, carcass and skin of the fish to form a minced meat mass that is colored with a heat stable dye to resemble the natural color of the fish, setting or cooking, decoloring and micro cutting the minced meat and pumping or injecting the minced meat into fillet or loin portions of fish up to about 108% to about 150% of the original weight of the loin portion. The loin portions injected with minced meat may then be cooked to form a product that has chewy texture, aroma and flavor of loins or fillet portions of fish.

10 Claims, No Drawings

PROCESS FOR PRODUCING A FISH PRODUCT

BACKGROUND OF THE INVENTION

This invention relates to a fish product utilizing red or dark meat portions of fish and more particularly, to a method of producing a fish product that utilizes about 50 to about 60% by weight of the whole fish.

A substantial portion of the available protein in fish is discarded during processing and used as animal feedstuff or fertilizer. The portion of the fish that is utilized in animal feedstuffs comprises red meat, trimmings, including tails, carcasses and skin, etc., which normally aren't acceptable in terms of appearance as an ingredient in human foods. The unacceptability of certain portions of fish for human consumption leads to processing inefficiencies and a void in filling the nutritional needs of individuals.

Efforts have been made to produce acceptable products for human consumption from the red or dark meat portions of fish. British Pat. No. 1,108,188 shows the extraction of fish protein by treating fish for two hours at a pH of about 13 and a temperature of 50° C., and after purification, the solution is deodorized with a peroxide solution having a concentration of 0.015% by weight, and a pH of 8.5, at a temperature of 80° C., for two hours. U.S. Pat. Nos. 4,060,644 and 4,136,204 show the bleaching of undissolved fish skeletal meat with a dilute aqueous solution of hydrogen peroxide and up to 10% by weight polyphosphate, preferably sodium tripolyphosphate at a pH of 10.5 to 11.5. The hydrogen peroxide is removed with catalase at a pH of 7.5 to 8.0. The pH of the bleached fish is then lowered to 6 to 7 by being washed with a food acid. There is no indication of improved texture of this product particularly when combined with light colored fish meat.

In British Pat. No. 1,400,876, the use of hydrogen peroxide to decolorize fish flesh at a pH of not more than 9.5 and at a temperature of between 30° and 70° C., is shown. Trash fish flesh is mixed with aqueous sodium hydroxide and heated to 50° C. The disclosure states the protein recovered from solution is unsuitable as a substitute or filler for animal proteins for human consumption because of inadequate nutritional quality. A protein isolate is prepared in U.S. Pat. No. 3,879,370 which is decolorized by hydrogen peroxide and deodorized by extraction with isopropanol. The nutritional value of the white isolate powder is adequate but it has undesirable texture for a restructured meat product.

The present invention relates to a process and product wherein substantially decolored dark meat from fish is utilized to provide a nutritious, palatable food product when combined with light meat from fish to provide a palatable, nutritious fish product utilizing up to about 50 to about 60% by weight whole fish.

SUMMARY OF THE INVENTION

The present invention comprises a process for decoloring red or dark meat of fish so that it may be pumped or injected into the white or light meat fillet or loin portions of fish. The dark meat is colored with a heat stable dye, heat set, decolorized by treatment with hydrogen peroxide, micro cut and then pumped or injected into the loin portions of fish up to about 108% to about 150% of the original weight of the loin portion. The loins which have been injected with the minced meat may then be cooked, canned and retorted. The decolored meat resembles light meat in fiber, size, texture, flavor and color so that the resultant product appears to be substantially 100% loin meat.

It is an object of the present invention to restructure and decolor the dark or red meat portions of fish.

Another object is to prepare a nutritious decolored meat product similar in appearance to loin portions of fish having a light color.

And yet another object of the present invention is to prepare a decolored, restructured meat product which can be pumped or injected into loin portions of fish up to about 108% to about 150% of the original weight of the loin portions so that about 50 to about 60% of the whole fish, preferably about 95% of the available muscle meat, may be utilized as a human food source.

DETAILED DISCUSSION

Substantially all portions of fish may be utilized efficiently and economically in the process of the present invention to provide a fish product acceptable and palatable to human tastes. Although there are many types of fish processed and used commerically, this invention was conceived and developed largely for the decoloring and restructuring of red or dark meat found in tuna and tuna-like species which include, but is not limited to, skipjack, yellowfin, albacore, bonito, blue fin, big eye, yellowtail, mackerel, etc. The utilization of fish according to the improved process of the present invention increases process flow efficiencies so that small fish, up to nine to eleven pounds in weight, can be processed for canning in an efficient, economical manner. Previously, by-products of the fish processing have been converted to fish meal and animal foods. The present invention permits the utilization of red or dark meat, trimmings, bellies, bone and minimal amounts of skin in a palatable nutritious food product acceptable for human consumption.

The preferred starting material is fresh or thawed tuna or tuna-like fish weighing about nine to eleven pounds. Both larger and smaller fish may be processed efficiently and economically, but due to increased fishing pressure of selected species, the average size of the preferred fish utilized by tuna canners, skipjack and yellowfin tuna, has been decreasing. The size of the fish is not intended to be limiting, but is merely suggested due to the availability of fish. Fish can be economically processed according to the present invention that weigh as little as one pound or as much as one hundred pounds or more.

In accordance with the present invention, the head and viscera of the fish are removed mechanically or manually depending on the size of the fish. For the sake of efficiency, this operation is preferably performed mechanically particularly on fish weighing nine pounds or less. Additionally, the loins or fillets can be removed from the fish at this time. This step can also be performed manually or by machine but the result is to produce loins or fillets of the white or light colored portions of the fish. The red meat portions of the fish particularly, the red meat found in the loin or fillet extending laterally through the loin parallel to the backbone of the fish, can be removed manually from the loin with a sharp knife. The red meat is trimmed off loin or fillet portions and separated. The loins are then skinned manually or by machine in such a manner to minimize cutting loss.

The red or dark meat portions including the trimmings from the light meat loin or fillets, skin, and carcass contain appreciable quantities of highly nutritious flesh but have a low commercial value when converted to fish meal or animal food because of the high content of bone and fat, the poor color and limited storage capacity. In accordance with the present invention, the above-mentioned materials can be easily produced into a product acceptable for human consumption. These materials are subjected to mechanical bone removal methods. With no intention to limit the present invention, suitable methods of achieving separation of bone and other hard inedible material include a process where flesh is pressed through perforations in a drum, while leaving the bone. Deboning devices which utilize this process are manufactured by Beehive Machinery, Inc., Sandy, Utah and Nordischer Maschienbau Rnd. Baader, Lubeck, Germany. Preferably, the carcass and the skin are passed through the device before the other materials. The bone residue is separated and made into bone meal or other by-products.

The fish obtained after removal of substantially all of the bone will usually be in the form of minced meat or finely divided fish muscle.

The comminuted minced meat or finely divided fish muscle mass is then restructured. The minced meat is preferably mixed with an oil to faciliate restructuring and to provide a better mouthfeel. Optionally, about 1-20% unsaturated vegetable oil may be admixed with the minced meat. Preferably, however, a hydrogenated vegetable oil such as any commercially available as general purpose or all purpose vegetable oil or shortening in a liquid or solid form at room temperature, is used in amounts ranging from about 1 to about 3% by weight, more preferably about 1% by weight. With no intent to limit the invention, the hydrogenated vegetable oils are preferred to prevent any unnecessary unsaturated fat from reacting in subsequent decoloring steps utilizing hydrogen peroxide.

An important sequence of steps in the process of the present invention involves the coloring and decoloring of the minced meat. The minced meat must be treated with a suitable heat stable red dye, such as FD&C #3. The heat stable dye is added to the minced meat before decoloring to insure the proper color of the fish is maintained through the steps of heat setting, decoloring and retorting the meat product. Accordingly, an effective amount of any conventional heat stable red dye may be added to the minced meat to match the natural color of the fish, preferably tuna after retorting. Preferably, amounts ranging from about 10 to about 30 mg of the heat stable red dye are added to each kilogram of minced meat, preferably 20 mg/kg.

As a flavoring aid, whole dried egg may optionally be added to the minced meat in an amount ranging from about 0.5 to about 2% by weight, preferably 1% by weight.

The minced meat mass is thoroughly mixed and heat set or cooked in a water bath at a temperature below that which will extract the oil present in the material. A preferred apparatus for this procedure is a jacketed kettle. The temperature for the heat setting or cooking may vary depending upon the period of time the minced meat mass remains in the bath. Other means within the knowledge of one skilled in the art besides hot water bath or jacketed kettle may be utilized to heat set or cook the minced meat material. However, a water bath or jacketed kettle is preferred.

After cooking or heat setting, the temperature of the water may be decreased to about 70° C. prior to the addition of hydrogen peroxide. Alternately, the heat set extruded material may be removed and placed in another water bath at this temperature. The pH of the solution should be in the range of 4.0 to 8.0, preferably 6.0 to 8.0. Any food grade alkaline material such as sodium hydroxide may be utilized to adjust the pH. The material is then immersed in the hydrogen peroxide solution for an effective time and at an effective temperature to obtain the color of tuna. An arbitrary tuna color has been determined on a Gardner Colorimeter, manufactured by Gardner Labs, Inc. Bethesda, Md. 20014, to have the lightness $L=40$ to 50 after retort cooking. The color after decoloring should be about $L=58$. The rate of color lightening is a function of hydrogen peroxide concentration, temperature and time. The concentration of the hydrogen peroxide may range from about 0.2 to 1% by weight hydrogen peroxide. About a one hour reaction time at room temperature with 0.5% hydrogen peroxide would be suitable for obtaining a tuna color in the heat set extruded minced meat material. The same concentration of hydrogen peroxide at 50° C. would require a reaction time of about one half-hour.

The decolored material may be removed from the hydrogen peroxide solution and allowed to drain. The residual hydrogen peroxide can be removed by any standard technique which does not leave any deleterious matter in or on the fish. The hydrogen peroxide can be removed by water washing or by compressing lightly to squeeze out excess liquid. A preferred method is to contact the decolored fish with a dilute solution of catalase containing about 50 units of catalase per kg of decolored minced meat material. The catalase can be easily removed by draining since the minced meat is dewatered to about a level of 30% solids, similar to the solids level of loin meat.

The minced meat is then microcut to a size of about 260 microns to about 400 microns to insure easy passage of the material through the pumping or injection needles. The size of the cut is not intended to be limiting, for any size that is effective to promote pumping through a desired pumping or injection needle diameter may be utilized. It is preferred however, that the minced meat is cut to a size of about 260 microns to about 400 microns to pass through a needle having the inside diameter of about 1000 to about 2000 microns. The minced meat may be injected into the rolled loins in any suitable pumping or injection apparatus known to skilled workers in the art. The pressure applied for pumping the minced meat may vary with the pumping or injecting apparatus and is readily knowledgeable to a skilled worker in the art. The pressure could vary from about 20 to about 100 psi depending upon the apparatus and amount of water in the minced meat.

The minced meat may be pumped as is, that is after being dewatered from the decoloring solution. Optionally, it may be mixed with water in a ratio of about 1:1 to about 2:1, that is, 1 or 2 parts minced meat to 1 part water. The minced meat material may then be pumped or injected into the loin portions of the fish, preferably into the side of the loin opposite the side where the skin was removed in amounts ranging from 108 to 150% of the original weight of the loin. This amount is preferred for it provides a product with proper texture, appearance, fiber, aroma and flavor of 100% loin portions.

The loins injected with minced meat may then be cooked by passing them through a continuous cooker at a temperature sufficient to create an internal temperature of 47° C. to 66° C., preferably 55° C. to 58° C. for loins. The duration of cooking is dependent on the size of the loin. The loins are then cooled and cut or diced into fibrous bundles for canning. The loins may then be canned and retorted in accordance with conventional procedures.

The following examples are for purposes of illustration and are not intended to be limiting. For example, various modifications may be made such as the use of other types of fish material and other types of equipment.

EXAMPLE 1

Thawed skipjack tuna was mechanically processed to remove the loins which were temporarily set aside. The red or dark meat portions were separated and the skin, carcass and other pieces of bone material having red meat were mechanically deboned in a Beehive deboner. This deboned material was mixed with the other red meat to yield 4,860 grams of minced meat. Then about 20 milligrams per kilogram FD&C red dye No. 3 was added and mixed to the raw, minced skipjack tuna in a mixer. The material was then added to a jacketed kettle with an equal amount of water that was at 75° C. and was heat set or cooked for ten minutes. Afterwards, the material was decolored with 0.2% by weight hydrogen peroxide at 50° C. The material was placed into the hydrogen peroxide solution for about two hours. The minced meat material was removed from the decoloring solution, cooled and one milliliter of catalase added. An Urchel Micro-cutter was used to cut the material to a size of about 260 microns. Next the material was fed into a ⅓ horsepower Koch stitch pumping apparatus having a manifold with four needles in line. The diameters of the needles were about 2,000 microns. The pressure used to pump the material through the needles was 25 psi. The material was pumped into loins from the side opposite where the skin was removed. The following table shows the weights of the loins before and after pumping and the amount of material picked up in the loin.

| Loin | PUMP Before | After | % Pick up |
|---|---|---|---|
| 1 | 160 | 195 | 21.9 |
| 2 | 130 | 165 | 26.9 |
| 3 | 225 | 275 | 22.2 |
| 4 | 135 | 175 | 29.6 |
| 5 | 155 | 200 | 29.0 |
| 6 | 150 | 190 | 26.7 |
| 7 | 145 | 180 | 24.1 |
| 8 | 110 | 130 | 18.2 |
| 9 | 240 | 280 | 16.7 |
| 10 | 185 | 250 | 35.1 |
| 11 | 180 | 225 | 25.0 |
| 12 | 170 | 210 | 23.5 |
| 13 | 175 | 210 | 20.0 |
| 14 | 125 | 150 | 20.0 |
| 15 | 160 | 195 | 21.9 |
| 16 | 150 | 195 | 30.0 |
| 17 | 195 | 250 | 28.2 |

The loins were then cooked in a continuous cooker at an internal temperature of 56° C. Afterwards, the loins were cooled and cut or diced into fiber bundles and canned and further retorted.

EXAMPLE 2

Yellow fin tuna was used in this experiment and it was processed according to the procedure shown in Example 1. However, the minced meat was mixed with water in different proportions: 1:1 and 1:1.125 parts water. A Koch stitch pumping apparatus was used at a pressure of 20 psi to inject the minced meat into the loins. Following is a table showing the pumping yield of the minced meat into the loins.

|  | 1:1 | 1:1.25 |
|---|---|---|
| Weight before | 970 grams | 775 grams |
| Weight after | 1200 grams | 995 grams |
| Yield | 23.7% | 28.4% |

These loins were then cooked to an internal temperature of 56° C., diced into fibrous bundles, canned and retorted to yield a palatable fish product having the aroma, texture, and appearance of 100% loin meat.

What is claimed is:

1. A process for producing a fish product resembling in color fish having light colored loin meat comprising:
   comminuting red or dark meat portions of fish including trim, bellies, carcass and skin to form a minced meat mass,
   adding a heat stable red dye to said minced meat in amounts such that the color of the minced meat matches the natural color of fish loin after retorting,
   heat setting or cooking the minced meat with added dye,
   decoloring said dyed minced meat,
   microcutting the decolored minced meat to a size small enough to be pumped or injected,
   pumping or injecting the microcut meat into loin portions of fish to increase the weight up to about 108% to about 150% of the original weight of the loin portions and cooking the loin injected with microcut meat.

2. The process of claim 1 wherein from about 10 to about 30 mg of the heat stable red dye are added to each kilogram of minced meat.

3. The process of claim 2 wherein 20 mg of the heat stable red dye are added to each kilogram of minced meat.

4. The process of claim 1 wherein the minced meat mass is mixed with about 1 to about 20% by weight vegetable oil prior to extruding.

5. The process of claim 1 wherein the minced meat is decolored by being immersed in an aqueous solution containing hydrogen peroxide at a level of about 0.2 to about 1% by weight.

6. The process of claim 5 wherein the pH of the solution ranges from 6.0 to 8.0.

7. The process of claim 1 wherein the fish is selected from the group consisting of tuna and tuna-like species.

8. The process of claim 1 wherein the minced meat is heat set or cooked at a temperature of about 75° C.

9. The process of claim 1 wherein the minced meat is microcut to a size of about 260 to about 400 microns prior to pumping or injecting into the loin portions of fish.

10. The process of claim 1 wherein the minced meat is mixed with water in a ratio of at least 2:1 prior to heat setting or cooking of the minced meat.

* * * * *